US009884520B2

United States Patent
Kujime

(10) Patent No.: US 9,884,520 B2
(45) Date of Patent: Feb. 6, 2018

(54) PNEUMATIC TIRE

(71) Applicant: SUMITOMO RUBBER INDUSTRIES LTD., Kobe-shi (JP)

(72) Inventor: Tomoyuki Kujime, Kobe (JP)

(73) Assignee: SUMITOMO RUBBER INDUSTRIES LTD., Kobe-shi (JP)

( * ) Notice: Subject to any disclaimer, the term of this patent is extended or adjusted under 35 U.S.C. 154(b) by 337 days.

(21) Appl. No.: 14/711,068

(22) Filed: May 13, 2015

(65) Prior Publication Data
US 2015/0328940 A1 Nov. 19, 2015

(30) Foreign Application Priority Data

May 14, 2014 (JP) ................................. 2014-100770

(51) Int. Cl.
*B60C 15/06* (2006.01)
*B60C 11/13* (2006.01)
(Continued)

(52) U.S. Cl.
CPC ...... *B60C 15/0603* (2013.01); *B60C 11/0304* (2013.01); *B60C 11/0306* (2013.01);
(Continued)

(58) Field of Classification Search
CPC ............ B60C 15/0018; B60C 15/0236; B60C 15/0081; B60C 15/0607; B60C 15/0603;
(Continued)

(56) References Cited

U.S. PATENT DOCUMENTS

2007/0163696 A1* 7/2007 Iida ..................... B60C 15/0081
152/545
2008/0066843 A1* 3/2008 Alvarez ................ B60C 9/0007
152/451
(Continued)

FOREIGN PATENT DOCUMENTS

JP 2652855 B * 9/1997
JP 2012-236499 A 12/2012
(Continued)

OTHER PUBLICATIONS

English machine translation of JP2652855B, dated Sep. 1997.*

*Primary Examiner* — Robert Dye
(74) *Attorney, Agent, or Firm* — Oblon, McClelland, Maier & Neustadt, L.L.P.

(57) ABSTRACT

A pneumatic tire having a designated orientation for mounting to a vehicle includes a tread, sidewalls, beads including bead cores, respectively, and a carcass including a carcass ply. Each bead includes a rubber apex, an outer bead and an inner bead, the rubber apex includes an outer apex portion and an inner apex portion, the outer apex portion includes a first outer apex portion positioned inward from the carcass ply in the axial direction and a second outer apex portion positioned outward from the carcass ply in the axial direction, the inner apex portion includes a first inner apex portion positioned inward from the carcass ply in the axial direction and a second inner apex portion positioned outward from the carcass ply in the axial direction, and the second outer apex portion has height which is greater than height of the second inner apex portion in the radial direction.

20 Claims, 3 Drawing Sheets

(51) Int. Cl.
*B60C 11/03* (2006.01)
*B60C 15/02* (2006.01)
*B60C 15/00* (2006.01)
*B60C 15/05* (2006.01)
*B60C 17/00* (2006.01)

(52) U.S. Cl.
CPC ...... *B60C 11/1369* (2013.01); *B60C 15/0018* (2013.01); *B60C 15/0081* (2013.01); *B60C 15/0236* (2013.01); *B60C 15/05* (2013.01); *B60C 15/0607* (2013.01); *B60C 17/0009* (2013.01); *B60C 2011/0353* (2013.01); *B60C 2011/0381* (2013.01); *B60C 2011/0388* (2013.01); *B60C 2015/061* (2013.01); *B60C 2015/0614* (2013.01); *B60C 2015/0696* (2013.01)

(58) Field of Classification Search
CPC ...... B60C 2015/061; B60C 2015/0616; B60C 17/0009; B60C 17/0018; B60C 17/0027; B60C 17/0036
See application file for complete search history.

(56) References Cited

U.S. PATENT DOCUMENTS

| | | | |
|---|---|---|---|
| 2013/0112325 A1* | 5/2013 | Mukai | B60C 11/1369 152/209.8 |
| 2014/0224401 A1* | 8/2014 | Tanaka | B60C 17/0009 152/517 |

FOREIGN PATENT DOCUMENTS

| WO | WO02/096672 | * 12/2002 |
|---|---|---|
| WO | WO2013/047192 | * 4/2013 |

* cited by examiner

PNEUMATIC TIRE

CROSS-REFERENCE TO RELATED APPLICATIONS

The present application is based upon and claims the benefit of priority to Japanese Patent Application No. 2014-100770, filed May 14, 2014, the entire contents of which are incorporated herein by reference.

BACKGROUND OF THE INVENTION

Field of the Invention

The present invention relates to a pneumatic tire having satisfactory durability and steering stability.

Description of Background Art

A pneumatic tire may be provided with a carcass and a rubber apex where the carcass is composed of a carcass ply extending from the tread to a bead core on both sides of the bead, and the rubber apex extends radially about the tire in the bead along the carcass ply (see, for example, Japanese Unexamined Patent Application Publication No. 2012-236499). The entire contents of this publication are incorporated herein by reference.

SUMMARY OF THE INVENTION

According to one aspect of the present invention, a pneumatic tire having a designated orientation for mounting to a vehicle includes a tread, sidewalls, beads including bead cores, respectively, and a carcass including a carcass ply extending from the tread to the bead cores in the beads through the sidewalls. Each of the beads includes a rubber apex extending along the carcass ply in a radial direction of the pneumatic tire, an outer bead positioned outward of the vehicle from a tire equator, and an inner bead positioned inward of the vehicle from the tire equator when the pneumatic tire is mounted to the vehicle, the rubber apex includes an outer apex portion at the outer bead and an inner apex portion at the inner bead in a tire meridian cross section which includes a rotation axis of the pneumatic tire in a normal state when the pneumatic tire is assembled on a standard rim and filled to a standard inflation pressure, the outer apex portion includes a first outer apex portion positioned inward from the carcass ply in an axial direction of the pneumatic tire and a second outer apex portion positioned outward from the carcass ply in the axial direction, the inner apex portion includes a first inner apex portion positioned inward from the carcass ply in the axial direction and a second inner apex portion positioned outward from the carcass ply in the axial direction, and the second outer apex portion has a height which is greater than a height of the second inner apex portion in the radial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
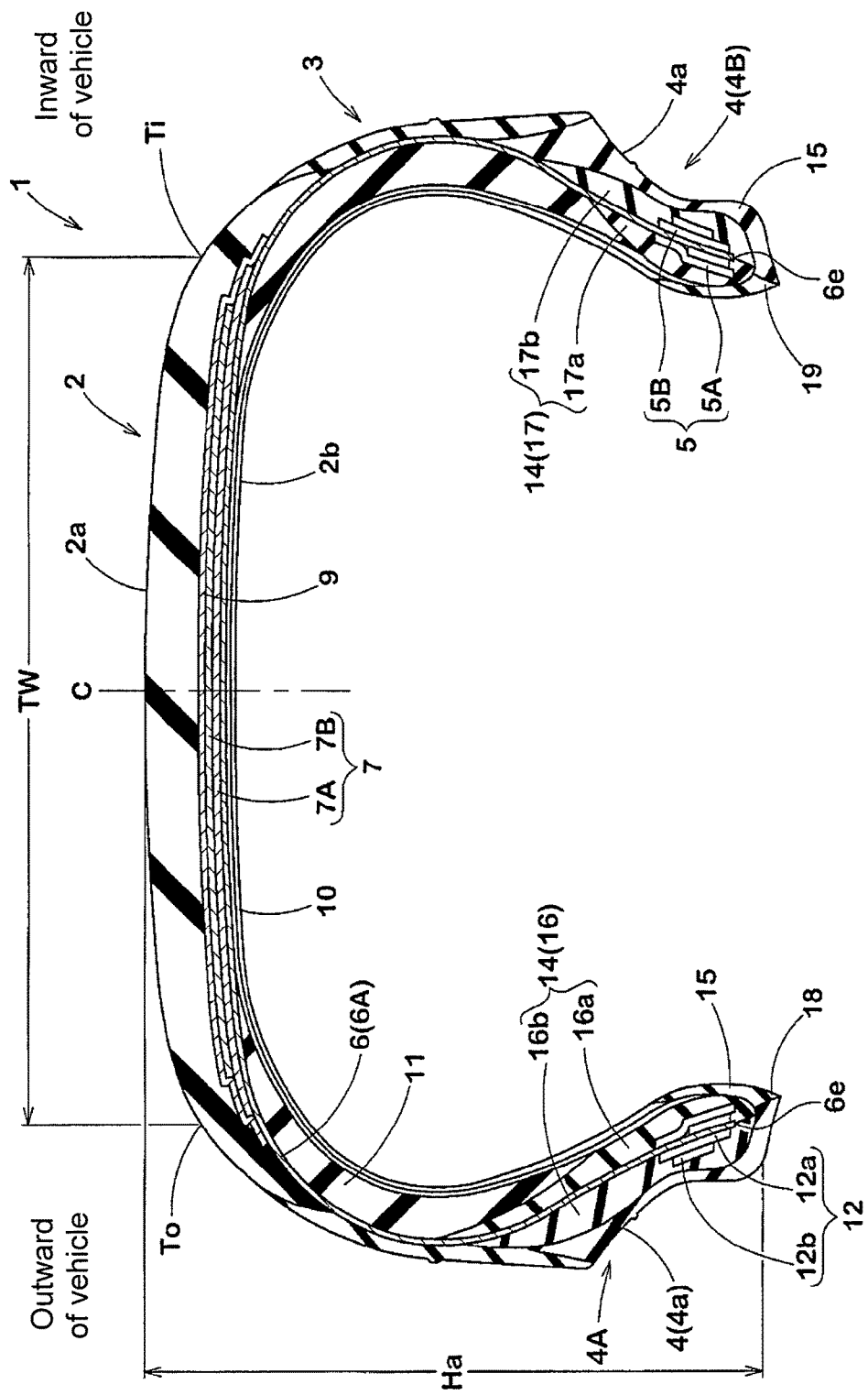
FIG. 1 is a cross-sectional view illustrating a pneumatic tire according to the first embodiment.

The embodiments will now be described with reference to the accompanying drawings, wherein like reference numerals designate corresponding or identical elements throughout the various drawings.

FIG. 1 is a diagram illustrating a tire meridian cross section of a pneumatic tire 1 in a normal state according to the embodiment. As illustrated in FIG. 1, the pneumatic tire 1 according to the embodiment (also referred to below simply as a "tire") is suitable for use in, for example, a passenger vehicle, particularly as a run flat tire.

The aforementioned "normal state" of the tire, is a state where the tire is placed on a standard rim (not shown), filled to a standard internal pressured, and is subject to no load. In the present description, unless otherwise mentioned, the size of each of the components of the tire is measured with the tire in the normal state.

A "standard rim" is a rim specified for each tire in standards provided in a regulatory system containing standards for that tire. For example, in the JATMA standard, this is a "Standard Rim"; in the T&RA standard, this is a "Design Rim"; and in the ETRTO standard, this is a "Measuring Rim". Additionally, the "standard inflation pressure" is the inflation pressure specified for each tire in standards provided in a regulatory system containing standards for that tire. For example, in the JATMA standard, this is the "Maximum Pneumatic Pressure"; in the T&RA, this is the maximum value listed in the table: "TIRE LOAD LIMITS AT VARIOUS COLD INFLATION PRESSURES", and in the ETRTO standard, this is the "INFLATION PRESSURE". The standard inflation pressure for a tire on a passenger vehicle is 180 kPa.

The tire 1 is provided with a tread 2, a pair of sidewalls 3, and beads 4. The tread includes a tread layer (2a) that comes in contact with the road surface; the pair of sidewalls 3 extend in the radial direction of the tire from both edges in the axial direction of the tire. Finally the beads 4 are provided inward of each of the sidewalls 3 in the radial direction of the tire.

The tire 1 according to the embodiment is mounted to the vehicle with a designated orientation. The tread 2 includes an outer tread edge (To) located outward of the vehicle when the tire is mounted to a vehicle, and an inner tread edge (Ti) located inward of the vehicle when the tire is mounted to a vehicle. The orientation of the tire when mounting the tire to a vehicle may be indicated on the sidewalls (not shown) using letters, and the like, for example.

The tread edges (To, Ti) are defined as the location of contact at the outermost in the axial direction of the tire when the flat surface of the tire in a normal state, and with a normal load makes contact at a camber of 0 degrees. The distance in the axial direction of the tire between each of the tread edges (To, Ti) is defined as the tread contact width (TW).

Additionally, a "standard load" is the load specified for each tire in standards provided in a regulatory system containing standards for that tire. For example, in the JATMA standard, this is the "Maximum Load Performance"; in the T&RA, this is the maximum value listed in the table: "TIRE LOAD LIMITS AT VARIOUS COLD INFLATION PRESSURES", and in the ETRTO standard, this is the "LOAD CAPACITY". The normal load is equivalent to 88% of the aforementioned loads when the tire is a passenger vehicle tire.

The tire 1 includes a carcass 6, a belt layer 7, an inner liner layer 10, and a side cushioning gum layer 11.

The carcass 6 is composed of a carcass ply (6A) provided with carcass cords extending from the tread 2 to the sidewalls 3 and up to the bead core 5 of the beads 4. The carcass ply (6A) may be, for example, carcass cords made from organic fibers and laid at 75 to 90 degrees relative to the direction of the tire equator (C). The carcass ply (6A) in the embodiment is toroidal shaped and spans both the beads (4, 4) in the axial direction of the tire. The edges (6e) on both sides of the carcass ply (6A) end at the bead core 5 without being folded at the bead core 5. The carcass 6 is not limited to this particular form. For instance, the carcass 6 may include a carcass body running from the tread 2 past the sidewalls 3 and up to the bead core 5 of the beads 4, and a folded portion (not shown) extending from the carcass body and folded back from the inside to the outside around the bead core 5 in the axial direction of the tire.

The belt layer 7 is arranged outward of the carcass ply (6A) in the radial direction of the tire. The belt layer 7 is made up of at least two or more belt plies (7A, 7B). In the case of this embodiment, the belt layer 7 includes two belt plies on the inside and the outside respectively in the radial direction of the tire. Each of the belt plies (7A, 7B) includes highly elastic belt cords, such as steel cords that are inclined relative to the tire equator (C) at 15 to 40 degrees.

A band layer 9 is provided outside the belt layer 7 in the radial direction of the tire in the embodiment. The band layer 9 may be, for instance, band cords, such as nylon cords wound in spirals outside the belt layer 7. The band layer 9 in the embodiment is formed as a so-called full band ply having a greater width than the belt layer 7. For instance, the band layer 9 may also be a pair of left and right edge band plies covering only the outer edges of the belt layer 7 in the axial direction of the tire.

The inner liner layer 10 is arranged inward of the carcass 6 and forms the inner luminal face (2b) of the tire. For instance, the inner liner layer 10 may be made of air-impervious rubber such as isobutylene-isoprene rubber, halogenated butyl rubber, and the like to retain the air filling the tire within the inner luminal face of the tire in an airtight manner.

In the embodiment, the side cushioning gum layer 11 is provided between the carcass 6 and the inner liner layer 10 in the sidewall 3. The side cushioning gum layer 11 is hardened rubber capable of providing the run flat feature. In the embodiment, the thickness of the side cushioning gum layer 11 gradually decreases from a center portion which is the thickest part, to the inner edges and outer edges respectively in the radial direction of the tire and thus has a crescent moon cross section.

For the side cushioning gum layer 11 to allow the tire to run flat, as well as reduce heat buildup during travel and increase the durability of the tire while the tire runs flat, the complex modulus $E^*1$ of the side cushioning gum layer 11 is preferably about 4.5 to 14 MPa, with loss tangent $\tan \delta 1$ of 0.025 to 0.08.

In this description, the complex modulus $E^*$ and the loss tangent $\tan \delta$ are defined in the JIS-K6394 standard and were measured under the following conditions using a viscoelasticity spectrometer manufactured by Iwamoto Quartz Glass-Lab Co., Ltd.

Initial Warping: 10%
Amplitude: ±2%
Wavelength: 10 Hz
Deformation Mode: Tensile Measurement Temperature: 70° C.

Each of the bead cores 5 are formed by an inner bead core piece (5A) and an outer bead core piece (5B) partitioned in the axial direction of the tire. In the embodiments the inner bead core piece (5A), and the outer bead core piece (5B) are made from non-extensible bead wires (not shown) wound multiple times in the circumferential direction of the tire into a wire winding 12. The inner bead core piece (5A), and outer bead cord piece (5B) are respectively formed by two wire windings (12a, 12b) overlapped on the inside and the outside in the axial direction of the tire. The edge (6e) of the carcass ply (6A) is held between the inner bead core piece (5A), and the outer bead core piece (5B).

The bead 4 is formed from an outer bead (4A), and an inner bead (4B). When the tire is mounted to a vehicle, the outer bead (4A) is located outward of the vehicle from the tire equator (C), and the inner bead (4B) is located inward of the vehicle from the tire equator (C).

The beads 4 are further provided with a rubber apex 14 extending along the carcass ply (6A) in the radial direction of the tire; and a clinch rubber 15 formed on the outer surface (4a) of the bead.

The clinch rubber 15 in the embodiment is a cross-sectional U-shaped that covers the rubber apex 14 from the inside to the outside in the axial direction of the tire. The clinch rubber 15 is formed from hardened rubber that is in contact with the rim (not shown) to prevent wear.

Figure 2:
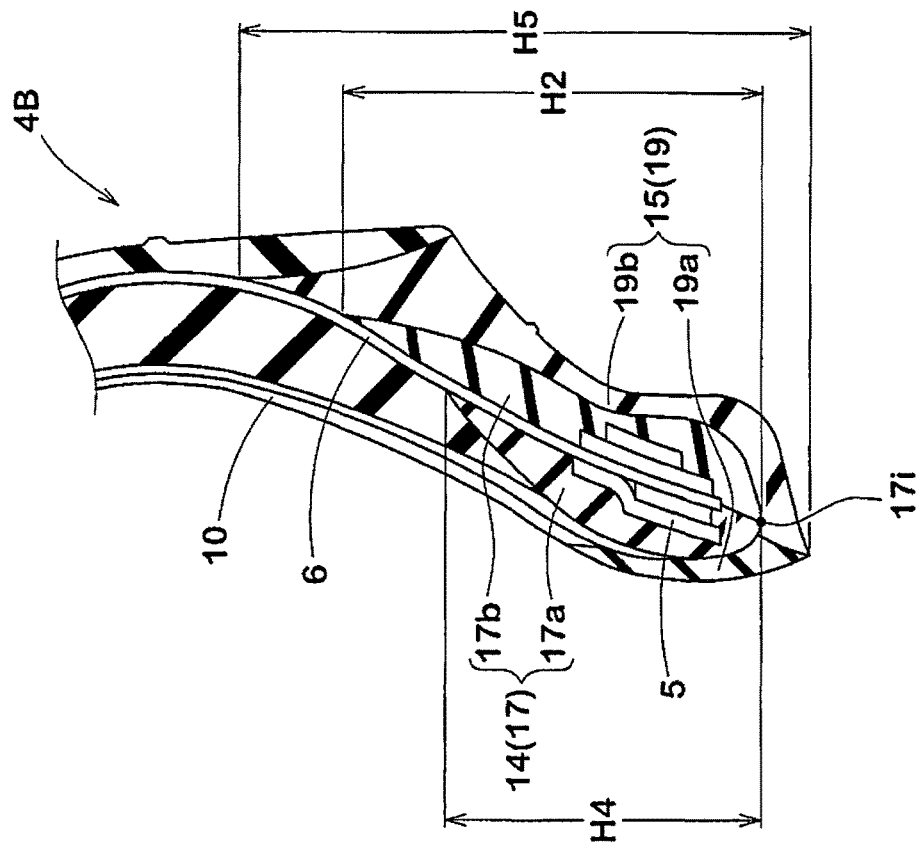
FIG. 2 is an exploded view of the outer bead and the inner bead in FIG. 1.
Figure 2:
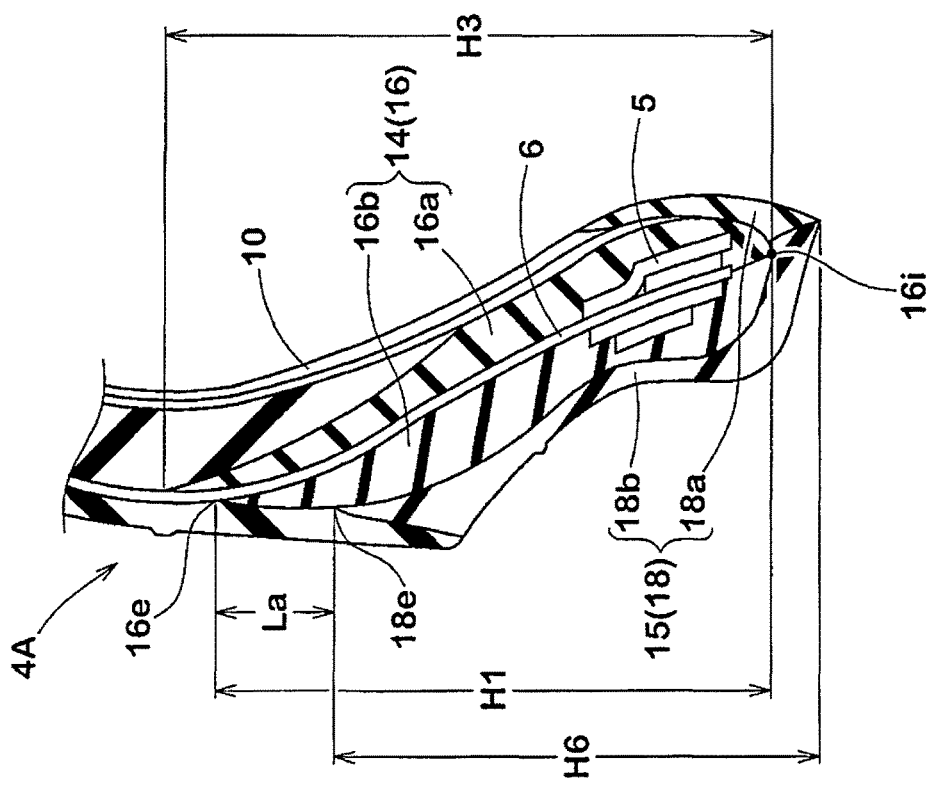

FIG. 2 is an exploded view illustrating the outer bead (4A) and the inner bead (4B) in FIG. 1 side-by-side. As illustrated in FIG. 2, the rubber apex 14 includes an outer apex part 16 and an inner apex part 17 provided at the outer bead (4A) and the inner bead (4B) respectively.

The outer apex part 16 includes a first outer apex portion (16a), and a second outer apex portion (16b). The first outer apex portion (16a) is located inward from the carcass ply (6A) in the axial direction of the tire, and the second outer apex portion (16b) is located outward from the carcass ply (6A) in the axial direction of the tire. In the embodiment, the first outer apex portion (16a) and the second outer apex portion (16b) are connected inward from the bead core 5 in the radial direction of the tire. This kind of outer apex part 16 is capable of suppressing any loosening to further securely retain the bead core 5 and the carcass ply (6A).

The inner apex part 17 includes a first inner apex portion (17a), and a second inner apex portion (17b). The first inner apex portion (17a) is located inward from the carcass ply (6A) in the axial direction of the tire, and the second inner apex portion (17b) is located outward from the carcass ply (6A) in the axial direction of the tire. In the embodiment, the first inner apex portion (17a) and the second inner apex portion (17b) are connected inward from the bead core 5 in the radial direction of the tire.

The second outer apex portion (16b) has a greater height (H1) than the second inner apex portion (17b). When the vehicle turns, a larger load acts on the outer bead (4A). Therefore, the greater height of the second outer apex portion (16b) which is located outside the carcass ply (6A) thus satisfactorily improves the flexural rigidity of the outer bead. At the same time, with regard to the heat generated during travel, the greater height of the second outer apex portion suppresses heat buildup in the inner bead (4B) which tends to get covered, and prevents damage due to heat. Therefore, the steering stability and the durability are improved in a well-balanced manner in the pneumatic tire according to an embodiment of the present invention.

Each of the second apex portions (16b, 17b) are closer to the rim flange compared it to each of the first apex portions (16a, 17a); therefore when the tire is filled to the maximum inflation pressure, a large contraction stress acts on each of the second apex portions (16b, 17b). Thus, each of the second apex portions (16b, 17b) tends to generate heat compared to each of the first apex portions (16a, 17a). Accordingly, the size of each of the second apex portions (16b, 17b) are improved upon in the tire 1 according to an embodiment of the present invention, to thereby effectively improve the durability and the steering stability of the tire in a well-balanced manner.

In order to effectively bring about the above-described effects, the height (H1) of the second outer apex portion (16b) in the radial direction of the tire is preferably 1.1 to 1.5 times the height (H2) of the second inner apex portion (17b) in the radial direction of the tire. In particular, when the height (H1) of the second outer apex portion (16b) in the radial direction of the tire is more than 1.5 times the height (H2) of the second inner apex portion (17b) in the radial direction of the tire, either in the heat buildup tends to increase in the outer bead (4A), or, the rigidity of the inner bead (4B) deteriorates excessively, and worsens the steering stability of the tire.

The height (H1) of the second outer apex portion (16b) is preferably 40% to 60% of the cross-sectional height (Ha) (shown in FIG. 1) of the tire. Note, the height of each of the outer apex portions (16a, 16b) is the distance from the inner edge (16i) to the outer edge of the outer apex part 16 in the radial direction of the tire. Further the height of each of the inner apex portions (17a, 17b) is the distance from the inner edge (17i) to the outer edge of the inner apex part 17 in the radial direction of the tire.

The first inner apex portion (17k) is a height (H4) that is preferably shorter than the second inner apex portion (17b). Hereby, the rigidity of the second inner apex portion (17b) on which a large amount of stress acts due to the inflation pressure increases. At the same time the first inner apex portion (17a) on which a relatively small load acts during a turn can be made smaller. Consequently, heat buildup can be suppressed. Therefore, the steering stability and the durability of the tire are improved in a well-balanced manner.

The height (H4) of the first inner apex portion (17a) in the radial direction of the tire is more preferably 0.55 to 0.95 times the height (H2) of the second inner apex portion (17b) in the radial direction of the tire.

When the height (H4) of the first inner apex portion (17a) in the radial direction of the tire is less than 0.55 times the height (H2) of the second inner apex portion (17b) in the radial direction of the tire, there is excessive heat buildup in the second inner apex portion (17b). Alternatively, the rigidity of the inner bead (4B) in the axial direction of the tire deteriorates, thereby worsening the steering stability of the tire.

It is preferable for the second outer apex portion (16b) to have a smaller height (H1) than the first outer apex portion (16a). In other words, it is preferable to secure a large amount of flexural rigidity in the outer bead (4A) on which a large load acts when the vehicle turns in relation to a load acting in either inward or outward in the axial direction of the tire. A large amount of very-hardened clinch rubber 15 is also arranged in the beads 4, outward of the carcass ply (6A). Therefore, providing a second outer apex portion (16b) with a smaller height (H1) than the first outer apex portion (16a) thereby secures the flexural rigidity of the beads 4 on which a large load acts during left and right turns, in a well-balanced manner. The steering stability of the tire thereby greatly improves.

The height (H1) of the second outer apex portion (16b) in the radial direction of the tire is more preferably 0.70 to 0.98 times the height (H3) of the first outer apex portion (16a) in the radial direction of the tire. When the height (H1) of the second outer apex portion (16b) in the radial direction of the tire is less than 0.70 times the height (H3) of the first outer apex portion (16a) in the radial direction of the tire, the flexural rigidity of the beads 4 becomes smaller in relation to an outward force in the axial direction of the tire, and steering stability of the tire worsens. Additionally, when the height (H1) of the second outer apex portion (16b) in the radial direction of the tire is more than 0.98 times the height (H3) of the first outer apex portion (16a) in the radial direction of the tire, there is excessive heat buildup in the second outer apex portion (16b), and the durability of the tire worsens.

Thus from the viewpoint of providing such a rubber apex 14 that ensures flexural rigidity, and deforms flexibly to prevent peeling away from the carcass ply, the complex modulus $E^*2$ is, for instance, preferably around 30 to 100 MPa. Furthermore, in order for the rubber apex 14 to suppress heat buildup and increase durability, as well as reduce the difference in rigidity with the clinch rubber 15 to increase durability, the loss tangent $\tan \delta 2$ of the rubber apex 14 is, for instance, preferably about 0.1 to 0.25. In the case of the rubber apex 14 according to the embodiment, the same complex modulus $E^*2$ and the same loss tangent $\tan \delta 2$ are used to facilitate production.

The clinch rubber 15 includes an outer clinch part 18 provided in the outer bead (4A), and an inner clinch part 19 provided in the inner bead (4B).

The outer clinch part 18 includes a first outer clinch portion (18a), and a second outer clinch portion (18b). The first outer clinch portion (18a) is arranged inward of the first outer apex portion (16a) in the axial direction of the tire, and the second outer clinch portion (18b) is arranged outward of the second outer apex portion (16b) in the axial direction of the tire. The inner clinch part 19 includes a first inner clinch portion (19a), and a second inner clinch portion (19b). The first inner clinch portion (19a) is arranged inward of the first inner apex portion (17a) in the axial direction of the tire, and the second inner clinch portion (19b) is arranged outward of the second inner apex portion (17b) in the axial direction of the tire.

The second inner clinch portion (19b) has a greater height (H5) than the second inner apex portion (17b). Thus, the outward rigidity of the inner bead (4B) in the axial direction of the tire may be increased even more, to achieve superior steering stability in relation to a large load when the vehicle turns while traveling.

The height (H5) of the second inner clinch portion (19b) in the radial direction of the tire is more preferably 1.1 to 1.7 times the height (H2) of the second inner apex portion (17b) in the radial direction of the tire. In particular, when the height (H5) of the second inner clinch portion (19b) in the radial direction of the tire is more than 1.7 times the height (H2) of the second inner apex portion (17b) in the radial direction of the tire, the second inner apex portion (17b) is too small, and thus steering stability cannot be properly achieved.

The height (H5) of the second inner clinch portion (19b) in the radial direction of the tire is preferably greater than the height (H6) of the second outer clinch portion (18b) in the radial direction of the tire. Hereby, the steering stability and durability of the tire further improves because the heat in the second outer apex portion (16b) which tends to have a large heat buildup, can be exhausted unimpeded from the outer surface (4a) of the bead, and the flexural rigidity of the inner bead (4B) can be secured.

The height (H5) of the second inner clinch portion (19b) in the radial direction of the tire is more preferably 1.05 to 1.25 times the height (H6) of the second outer clinch portion (18b) in the radial direction of the tire. When the height (H5) of the second inner clinch portion (19b) in the radial direction of the tire exceeds 1.25 the height (H6) of the second outer clinch portion (18b) in the radial direction of the tire, the inner bead (4B) is excessively rigid, suppressing flexible deformation of the second inner apex portion (17b), and the durability of the tire worsens.

The outer edge (18e) of the second outer clinch portion (18b) in the radial direction of the tire is preferably positioned inward from the outer edge (16e) of the second outer apex portion (16b) in the radial direction of the tire. Hereby, the first outer apex portion (16a), the second outer apex portion (16b), and the second outer clinch portion (18b) ensures greater rigidity for the bead in a well-balanced manner in relation to large contraction stresses inward and outward in the axial direction of the tire, thus achieving superior steering stability for the tire.

The distance (La) between the outer edge (18e) of the second outer clinch portion (18b) and the outer edge (16e) of the second outer apex portion (16b) in the radial direction of the tire is preferably 2% to 10% of the cross-sectional height (Ha) of the tire. When the aforementioned distance (La) is more than 10% of the cross-sectional height (Ha) of the tire, a large amount of rigidity cannot be secured for the outer bead (4A) outward in the axial direction of the tire. When the aforementioned distance (La) is less than 2% of the cross-sectional height (Ha) of the tire, the rigidity of the outer bead (4A) outward in the axial direction of the tire is excessively large. Therefore, the balance in turning left or right deteriorates, and the steering stability worsens.

From the viewpoint of effectively producing the above described effects, the complex modulus E*3 of the clinch rubber 15 is preferably 6 to 15 MPa. Additionally, the loss tangent tan δ3 of the clinch rubber 15 is preferably 0.08 to 0.23. In the case of the clinch rubber 15 according to the embodiment, the same complex modulus E*3 and the same loss tangent tan δ2 are used to facilitate production.

Figure 3:
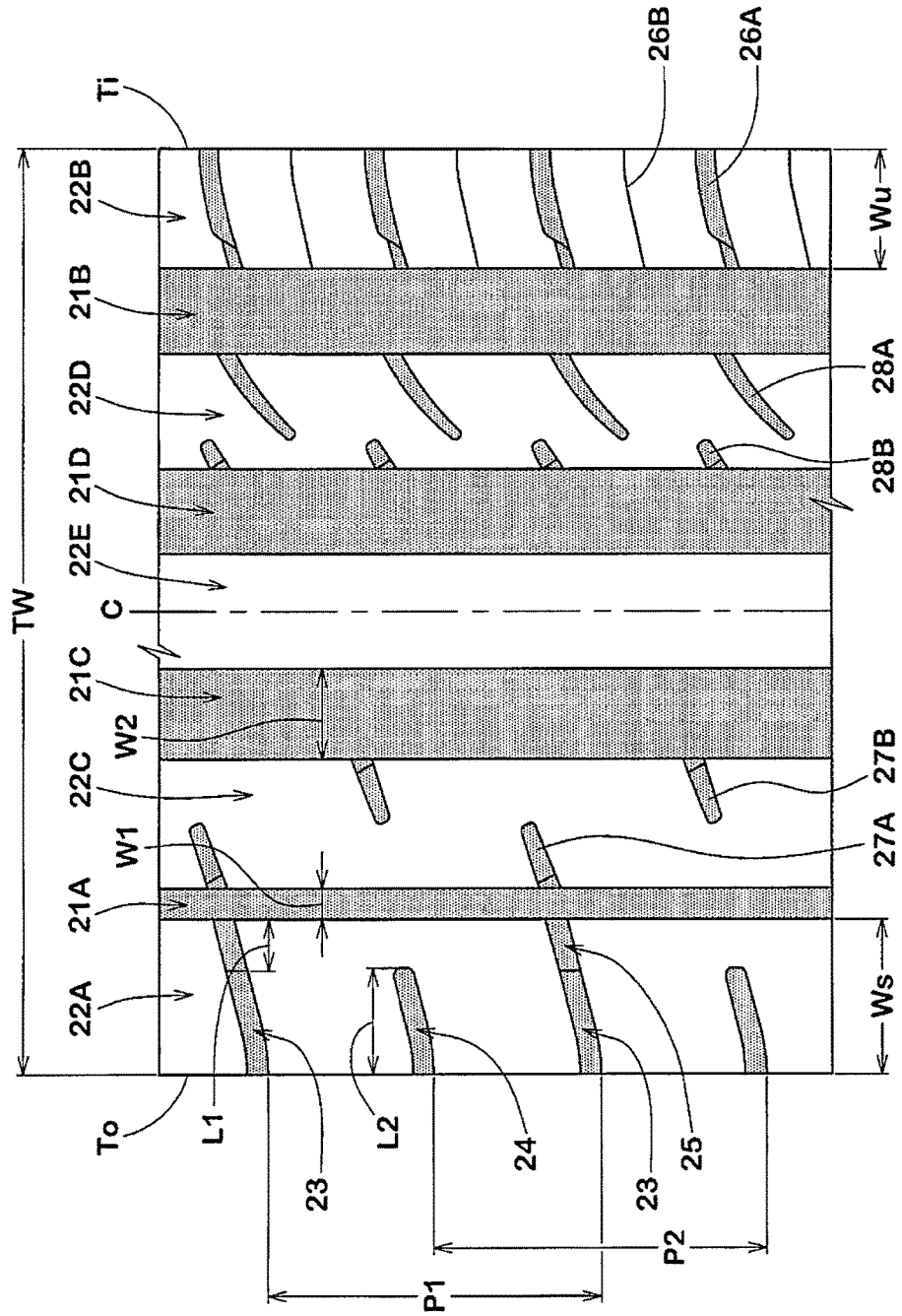
FIG. 3 is a broken-out view of the tread in FIG. 1.

FIG. 3 is an expanded view of the tread 2. As illustrated in FIG. 3, the tread includes a main groove 21 that continues and extends in the circumferential direction of the tire.

The main groove 21 in the embodiment includes a main outer shoulder groove (21A), a main inner shoulder groove (21B), a main outward center groove (21C), and a main inward center groove (21D). The main outer shoulder groove (21A) is provided near the outermost outer tread edge (To). The main inner shoulder groove (21B) is provided near the innermost inner tread edge (Ti). The main outward center groove (21C) is provided between the tire equator (C) and the main outer shoulder groove (21A). The main inward center groove (21D) is provided between the main outer shoulder groove (21B) and the tire equator (C).

Hereby, an outer shoulder land (22A), and inner shoulder land (22B), an outer middle land (22C), an inner middle land (22D), and a center land (22E) are formed in the tread 2.

The outer shoulder land (22A) is provided between the main outer shoulder groove (21A) and the outer tread edge (To). The inner shoulder land (22B) is provided between the main inner shoulder groove (21B) and the inner tread edge (Ti). The outer middle land (22C) is provided between the main outer shoulder groove (21A) and the main outward center groove (21C). The inner middle land (22D) is provided between the main inner shoulder groove (21B) and the main inward center groove (21D). Finally, the center land (22E) is provided between the main outward center groove (21C) and the main inward center groove (21D).

All the main grooves 21 in the embodiment form a straight line along the circumferential direction of the tire. Thus, each of the lands 22 is ensured to be sufficiently rigid, thereby achieving superior steering stability in the tire.

The width (Ws) of the outer shoulder land (22A) in the axial direction of the tire is preferably greater than the width (Wu) of the inner shoulder land (22B) in the axial direction of the tire. The width (Ws) of the outer shoulder land (22A) in the axial direction of the tire is preferably 12% to 20% of the tread contact width (TW). The width (Wu) of the inner shoulder land (22B) in the axial direction of the tire is preferably 8% to 16% of the tread contact width (TW).

Outer shoulder lateral grooves 23 and outer shoulder lug grooves 24 are provided in the outer shoulder land (22A). The outer shoulder lateral grooves 23 connect the outer tread edge (To) and the main outer shoulder groove (21A). The outer shoulder lug grooves 24 extend from the outer tread edge (To) toward the tire equator (C) and end inside the outer shoulder land (22A).

In outer shoulder lateral groove 23, a tiebar having a raised groove bottom is provided.

The length (L1) of the tiebar 25 in the axial direction of the tire is preferably 20% to 50% of the width (Ws) of the outer shoulder land (22A). The depth of the tiebar 25 is 30% to 70% the maximum depth of the outer shoulder lateral groove 23.

The length (L2) of the outer shoulder lug groove 24 in the axial direction of the tire is 45% to 85% the width (Ws) of the outer shoulder land (22A) in the axial direction of the tire. The depth of the outer shoulder lug groove 24 is 80% to 100% the depth of the outer shoulder lateral groove 23.

Inner shoulder lateral grooves (26A), and inner shoulder sipes (26B) are provided in the inner shoulder land (22B). The inner shoulder lateral grooves (26A) connect the inner tread edge (Ti) and the main inner shoulder groove (21B). The inner shoulder sipes (26B) connect the inner tread edge (Ti) and the inner shoulder land (22B).

First outer middle lug grooves (27A) and second outer middle lug grooves (27B) are provided in the outer middle land (22C). The first outer middle lug grooves (27A) extend from the main outer shoulder groove (21A) toward the tire equator (C) and ends inside the outer middle land (22C). The second outer middle lug grooves (27B) extend from the main outward center groove (21C) to the outer tread edge (To) and end inside the outer middle land (22C).

First inner middle lug grooves (28A) and second inner middle lug grooves (28B) are provided in the inner middle land (22D). The first inner middle lug grooves (28A) extend from the main inner shoulder groove (21B) toward the tire equator (C) and ends inside the inner middle land (22D). The second inner middle lug grooves (28B) extend from the main inward center groove (21D) to the inner tread edge (Ti) and ends inside the inner middle land (22D).

The center land (22E) may be formed as a plan rib with no lateral grooves or lug grooves provided therein.

In an embodiment of the present invention, to ensure favorable durability and steering stability of the tire, the width and depth of each of the grooves (23 through 28), and the width of each of the lands (22A through 22E) in the axial direction of the tire is respectively defined so that the outer shoulder land (22A) and the outer middle land (22C) outward of the vehicle are more rigid than the inner shoulder land (22B) and the inner middle land (22D) inward of the vehicle.

Here ends the detailed description of an embodiment of the present invention. The present invention is however not limited to the embodiment which provided merely as an example. Obviously, the invention may be modified and implemented in various forms.

EXAMPLES

Sample 245/45RF18 run flat tires with the basic structure illustrated in FIG. 1, and the basic pattern illustrated in FIG. 3 were tested on the basis of the parameters listed in Table 1. The steering stability, durability, and run flat durability of each of the sample tires were tested. The parameters and testing methods principally common among the sample tires were as follows.

Complex Modulus $E^{*2}$ of Rubber Apex: 55 MPa
Loss Tangent tan δ2 of Rubber Apex: 0.2
Complex Modulus $E^{*3}$ of Clinch Rubber: 10 MPa
Loss Tangent tan δ3 of Clinch Rubber: 0.1
Outer Shoulder Lateral Groove Width/TW 2.4%
Outer Shoulder Lateral Groove Pitch P1/TW 36%
Outer Shoulder Lug Groove Width/TW: 2.4%
Outer Shoulder Lug Groove Pitch P2/TW: 36%
Outer Shoulder Land Axial Direction Width Ws/TW: 16.7%

The symbols used in Table 1 are as follows.
H1: Height of the second outer apex portion in the radial direction of the tire
H2: Height of the second inner apex portion in the radial direction of the tire
H3: Height of the first outer apex portion in the radial direction of the tire
H4: Height of the first inner apex portion in the radial direction of the tire
H5: Height of the second inner clinch portion in the radial direction of the tire
La: The distance between the outer edge of the second outer clinch portion and the outer edge of the second outer apex portion in the radial direction of the tire The test method is as follows.

Steering Stability

Each of the sample tires was mounted to a 3000 cc passenger vehicle. A driver drove the above-described vehicle on a test course with a dry asphalt road surface. The driver evaluated components of the steering stability such as the handling response, grip, and impression of rigidity and the like by feel. The results are indicated as grades with the travel distance of Comparative Example 1 as 100. Larger numerical values indicate a better result.

Rim (All tires): 18×8.0 J
Inflation Pressure (All tires): 230 kPa

Durability

Using a drum-testing machine with a 1.7 m diameter, the distance traveled until the destruction of the bead in a sample tire was measured under the following conditions. The results are indicated as ratings with the travel distance of Comparative Example 1 as 100. Larger numerical values indicate a better result.

Rim: 18×8.0 J
Inflation Pressure: 230 kPa
Load: 4.53 kN
Speed: 80 km/h

Run Flat Durability

Using the above-mentioned drum-testing machine, the distance traveled by the sample tire while running flat was measured under the following conditions. The upper limit of the travel distance was set to 141 km. The results are represented in measured values (in kilometers). Larger numerical values indicate a better result. A sample tire exceeding a travel distance of 114 km was rated as passed.

Rim: 18×8.0 J
Inflation Pressure: 0 kPa (without valve core)
Load: 4.53 kN
Speed: 80 km/h

TABLE 1

| | Comparative Example 1 | Working Example 1 | Working Example 2 | Working Example 3 | Working Example 4 | Working Example 5 | Working Example 6 | Working Example 7 | Working Example 8 | Working Example 9 | Working Example 10 | Working Example 11 |
|---|---|---|---|---|---|---|---|---|---|---|---|---|
| Height Ratio H1/H2 | 1 | 1.3 | 1.1 | 1.5 | 1.6 | 1.3 | 1.3 | 1.3 | 1.3 | 1.3 | 1.3 | 1.3 |
| Height Ratio H4/H2 | 0.7 | 0.7 | 0.7 | 0.7 | 0.7 | 1 | 0.55 | 0.95 | 1 | 0.7 | 0.7 | 0.7 |
| Height Ratio H1/H3 | 0.8 | 0.8 | 0.8 | 0.8 | 0.8 | 0.8 | 0.8 | 0.8 | 0.8 | 0.6 | 0.7 | 0.98 |
| Height Ratio H5/H2 | 1.4 | 1.4 | 1.4 | 1.4 | 1.4 | 1.4 | 1.4 | 1.4 | 1.4 | 1.4 | 1.4 | 1.4 |
| Distance in relation to Cross-sectional Tire Height La/Ha (%) | 6 | 6 | 6 | 6 | 6 | 6 | 6 | 6 | 6 | 6 | 6 | 6 |
| Presence of Tiebar in Transverse Groove of Outer Shoulder | Present | Present | Present | Present | Present | Present | Present | Present | Present | Present | Present | Present |
| Lag Groove Length of Outer Shoulder L2/Ws (%) | 65 | 65 | 65 | 65 | 65 | 65 | 65 | 65 | 65 | 65 | 65 | 65 |
| Steering Stability [Grade: Larger value is better] | 100 | 110 | 108 | 107 | 105 | 107 | 109 | 108 | 105 | 107 | 108 | 108 |
| Durability [Rating: Larger value is better] | 100 | 110 | 107 | 109 | 108 | 106 | 108 | 107 | 107 | 108 | 108 | 109 |
| Run Flat Durability [km: Larger value is better] | 120 | 141 | 141 | 140 | 132 | 134 | 140 | 141 | 136 | 136 | 141 | 140 |

| | Working Example 12 | Working Example 13 | Working Example 14 | Working Example 15 | Working Example 16 | Working Example 17 | Working Example 18 | Working Example 19 | Working Example 20 | Working Example 21 | Working Example 22 | Working Example 23 |
|---|---|---|---|---|---|---|---|---|---|---|---|---|
| Height Ratio H1/H2 | 1.3 | 1.3 | 1.3 | 1.3 | 1.3 | 1.3 | 1.3 | 1.3 | 1.3 | 1.3 | 1.3 | 1.3 |
| Height Ratio H4/H2 | 0.7 | 0.7 | 0.7 | 0.7 | 0.7 | 0.7 | 0.7 | 0.7 | 0.7 | 0.7 | 0.7 | 0.7 |

TABLE 1-continued

| | | | | | | | | | | | | |
|---|---|---|---|---|---|---|---|---|---|---|---|---|
| Height Ratio H1/H3 | 1.0 | 0.8 | 0.8 | 0.8 | 0.8 | 0.8 | 0.8 | 0.8 | 0.8 | 0.8 | 0.8 | 0.8 |
| Height Ratio H5/H2 | 1.4 | 1.0 | 1.1 | 1.7 | 1.8 | 1.4 | 1.4 | 1.4 | 1.4 | 1.4 | 1.4 | 1.4 |
| Distance in relation to Cross-sectional Tire Height La/Ha (%) | 6 | 6 | 6 | 6 | 6 | 1 | 2 | 10 | 12 | 6 | 6 | 6 |
| Presence of Tiebar in Transverse Groove of Outer Shoulder | Present | Present | Present | Present | Present | Present | Present | Present | Present | Absent | Present | Present |
| Lag Groove Length of Outer Shoulder L2/Ws (%) | 65 | 65 | 65 | 65 | 65 | 65 | 65 | 65 | 65 | 65 | 100 | 30 |
| Steering Stability [Grade: Larger value is better] | 106 | 105 | 109 | 107 | 107 | 106 | 108 | 107 | 107 | 105 | 107 | 107 |
| Durability [Rating: Larger value is better] | 107 | 107 | 107 | 108 | 106 | 106 | 108 | 109 | 108 | 107 | 109 | 108 |
| Run Flat Durability [km: Larger value is better] | 135 | 136 | 141 | 141 | 137 | 135 | 141 | 141 | 137 | 136 | 141 | 141 |

The test results verified that tires according to the Working Examples exhibited well-balanced improvements to each type of performance factor compared to the Comparative Example. Finally, while tests were performed with varying tire sizes, the test results exhibited an identical trend.

In a pneumatic tire, increasing the volume of a rubber apex and the rigidity of a bead improves the steering stability of the tire. However, a larger rubber apex is subject to greater heat buildup during travel, and deterioration resulting therefrom causes the rubber apex to peel away from the carcass ply and loosen.

A pneumatic tire according to an embodiment of the present invention has satisfactory steering stability and durability.

A pneumatic tire according to an embodiment of the invention is a pneumatic tire with a designated orientation for mounting to a vehicle, and includes: a carcass formed from a carcass ply provided with a carcass cord extending from a tread to a sidewall and up to a bead core in a bead; a rubber apex extending in the bead along the carcass ply in the radial direction of the tire; the bead includes an outer bead and an inner bead, the outer bead located outward of the vehicle from the tire equator, and the inner bead located inward of the vehicle from a tire equator when the pneumatic tire is mounted to a vehicle; in a tire meridian cross section which includes the rotation axis of the tire in a normal state, the normal state being when the tire is assembled on a standard rim and filled to a standard inflation pressure, the rubber apex includes an outer apex part and an inner apex part at the outer bead and the inner bead respectively; the outer apex part includes a first outer apex portion, and a second outer apex portion, the first outer apex portion located inward from the carcass ply in the axial direction of the tire, and the second outer apex portion located outward from the carcass ply in the axial direction of the tire; the inner apex part includes a first inner apex portion, and a second inner apex portion, the first inner apex portion located inward from the carcass ply in the axial direction of the tire, and the second inner apex portion located outward from the carcass ply in the axial direction of the tire; and the height of the second outer apex portion in the radial direction of the tire is greater than the height of the second inner apex portion in the radial direction of the tire.

In a pneumatic tire according to an embodiment of the present invention the height of the second outer apex portion in the radial direction of the tire is 1.1 to 1.5 times the height of the second inner apex portion in the radial direction of the tire.

In a pneumatic tire according to an embodiment of the present invention, the height of the first inner apex portion in the radial direction of the tire is less than the height of the second inner apex portion in the radial direction of the tire.

In a pneumatic tire according to an embodiment of the present invention, the height of the first inner apex portion in the radial direction of the tire is 0.55 to 0.95 times the height of the second inner apex portion in the radial direction of the tire In a pneumatic tire according to an embodiment of the present invention, the height of the second outer apex portion in the radial direction of the tire is less than the height of the first outer apex portion in the radial direction of the tire.

In a pneumatic tire according to an embodiment of the present invention, the height of the second outer apex portion in the radial direction of the tire is 0.7 to 0.98 times the height of the first outer apex portion in the radial direction of the tire.

In a pneumatic tire according to an embodiment of the present invention, the bead core is formed by an inner bead core piece and an outer bead core piece partitioned inside and outside in the axial direction of the tire; and both edges of the carcass ply are clamped between the inner bead core piece and the outer bead core piece.

A pneumatic tire according to an embodiment of the present invention may also include: a clinch rubber included on the bead and forming the outer surface of the bead. The clinch rubber may be arranged outward of the second inner apex portion in the axial direction of the tire; and the height of the clinch rubber in the radial direction of the tire is greater than the height of the second inner apex portion in the radial direction of the tire.

In a pneumatic tire according to an embodiment of the present invention, the tread includes an outer tread edge located outward of a vehicle when the pneumatic tire is mounted to the vehicle. The pneumatic tire may also include: a main outer shoulder groove provided continuing from the outermost outer tread edge and extending along the circumferential direction of the tire to create an outer shoulder land between the outermost outer tread edge and the main outer shoulder groove; an outer shoulder lateral groove provided in the outer shoulder land connecting the outermost outer tread edge and the main outer shoulder groove; and in the outer shoulder lateral groove, a tiebar having a raised groove bottom is provided.

A pneumatic tire according to an embodiment of the present invention may also include: an outer shoulder lug groove provided in the outer shoulder land extending from the outermost outer tread edge to near the tire equator and ending in the outer shoulder land; the length of the outer shoulder lug groove in the axial direction of the tire is 45% to 85% of the width of the outer shoulder land in the axial direction of the tire.

A pneumatic tire according to an embodiment of the present invention includes a rubber apex extending in the radial direction of the tire at the bead, the bead including an outer bead located outward of the vehicle from the tire equator when the tire is mounted to the vehicle, and an inner bead located inward of the vehicle from the tire equator when the tire is mounted to the vehicle.

The rubber apex includes an outer apex part and an inner apex part at the outer bead and the inner bead respectively. The outer apex part includes a first outer apex portion, and a second outer apex portion. The first outer apex portion is located inward from the carcass ply in the axial direction of the tire, and the second outer apex portion is located outward from the carcass ply in the axial direction of the tire. The inner apex part includes a first inner apex portion, and a second inner apex portion. The first inner apex portion is located inward from the carcass ply in the axial direction of the tire, and the second inner apex portion is located outward from the carcass ply in the axial direction of the tire.

The second outer apex portion has a greater height than the second inner apex portion. When the vehicle turns, a larger load acts on the outer bead. Therefore, the greater height of the second outer apex portion which is located outside the carcass ply satisfactorily improves the flexural rigidity of the outer bead.

Whereas, compared to the outer bead, the inner bead tends to be difficult to cool with exposure to the external air during travel. For such an inner bead, the second inner apex portion may be made smaller to thereby suppress the generation of heat in the inner bead, and properly prevent increases in temperature in the inner bead. Therefore, the steering stability and the durability are improved in a well-balanced manner in the pneumatic tire according to an embodiment of the present invention.

Each of the second apex portions are arranged closer to the rim flange compared to the first apex portions. Consequently, when the tire is filled to the inflation pressure, a large amount of contraction stress acts on the second apex portions, and therefore the second apex portions tend to generate more heat than the first apex portions. Accordingly, the second apex portions are primarily improved upon in the pneumatic tire according to an embodiment of the present invention, to thereby effectively improve the durability and the steering stability of the tire in a well-balanced manner.

Obviously, numerous modifications and variations of the present invention are possible in light of the above teachings. It is therefore to be understood that within the scope of the appended claims, the invention may be practiced otherwise than as specifically described herein.

What is claimed is:

1. A pneumatic tire with a designated orientation for mounting to a vehicle, comprising:
   a tread;
   a plurality of sidewalls;
   a plurality of beads including a plurality of bead cores, respectively; and
   a carcass comprising a carcass ply extending from the tread to the bead cores in the beads through the sidewalls,
   wherein the plurality of beads includes an outer bead positioned outward of the vehicle from a tire equator, and an inner bead positioned inward of the vehicle from the tire equator when the pneumatic tire is mounted to the vehicle, the outer bead includes an outer apex extending along the carcass ply in a radial direction of the pneumatic tire, the inner bead includes an inner apex extending along the carcass ply in the radial direction of the pneumatic tire, the outer apex includes a first outer apex portion positioned inward from the carcass ply in an axial direction of the pneumatic tire and a second outer apex portion positioned outward from the carcass ply in the axial direction, the inner apex includes a first inner apex portion positioned inward from the carcass ply in the axial direction and a second inner apex portion positioned outward from the carcass ply in the axial direction, the second outer apex portion has a height which is greater than a height of the second inner apex portion in the radial direction in a tire meridian cross section which includes a rotation axis of the pneumatic tire in a normal state when the pneumatic tire is assembled on a standard rim and filled to a standard inflation pressure, the first inner apex portion has a height which is less than the height of the second inner apex portion in the radial direction in the tire meridian cross section, and the height of the second outer apex portion is less than a height of the first outer apex portion in the radial direction in the tire meridian cross section.

2. The pneumatic tire according to claim 1, wherein the height of the second outer apex portion in the radial direction is 1.1 to 1.5 times the height of the second inner apex portion in the radial direction.

3. The pneumatic tire according to claim 1, wherein the first inner apex portion has a height which is 0.55 to 0.95 times the height of the second inner apex portion in the radial direction.

4. The pneumatic tire according to claim 1, wherein the height of the second outer apex portion is 0.7 to 0.98 times a height of the first outer apex portion in the radial direction.

5. The pneumatic tire according to claim 1, wherein each of the bead cores comprises an inner bead core piece and an outer bead core piece partitioned inside and outside in the axial direction, and the carcass ply has edges which are clamped between the inner bead core piece and the outer bead core piece.

6. The pneumatic tire according to claim 1, wherein each of the beads has a clinch rubber forming an outer surface of each of the beads such that the clinch rubber is positioned outward of the second inner apex portion in the axial direction, and the clinch rubber has a height which is greater than the height of the second inner apex portion in the radial direction.

7. The pneumatic tire according to claim 1, wherein the tread has an outer tread edge positioned outward of the vehicle when the pneumatic tire is mounted to the vehicle, the tread has a main outer shoulder groove spaced from the outer tread edge and extending along a circumferential direction of the pneumatic tire such that an outer shoulder land is formed between the outermost outer tread edge and the main outer shoulder groove, and the tread has an outer shoulder lateral groove in the outer shoulder land connecting the outermost portion of the outer tread edge and the main outer shoulder groove such that the outer shoulder lateral groove has a tiebar having a raised groove bottom.

8. A pneumatic tire according to claim 7, wherein the outer shoulder land has an outer shoulder lug groove extending from the outermost portion of the outer tread edge toward the tire equator and ending in the outer shoulder land, and the outer shoulder lug groove has a length which is 45% to 85% of a width of the outer shoulder land in the axial direction.

9. The pneumatic tire according to claim 2, wherein the first inner apex portion has a height which is 0.55 to 0.95 times the height of the second inner apex portion in the radial direction.

10. The pneumatic tire according to claim 2, wherein height of the second outer apex portion is 0.7 to 0.98 times a height of the first outer apex portion in the radial direction.

11. The pneumatic tire according to claim 2, wherein each of the bead cores comprises an inner bead core piece and an outer bead core piece partitioned inside and outside in the axial direction, and the carcass ply has edges which are clamped between the inner bead core piece and the outer bead core piece.

12. The pneumatic tire according to claim 2, wherein each of the beads has a clinch rubber forming an outer surface of each of the beads such that the clinch rubber is positioned outward of the second inner apex portion in the axial direction, and the clinch rubber has a height which is greater than the height of the second inner apex portion in the radial direction.

13. The pneumatic tire according to claim 2, wherein the tread has an outer tread edge positioned outward of the vehicle when the pneumatic tire is mounted to the vehicle, the tread has a main outer shoulder groove spaced from the outer tread edge and extending along a circumferential direction of the pneumatic tire such that an outer shoulder land is formed between the outermost outer tread edge and the main outer shoulder groove, and the tread has an outer shoulder lateral groove in the outer shoulder land connecting the outermost portion of the outer tread edge and the main outer shoulder groove such that the outer shoulder lateral groove has a tiebar having a raised groove bottom.

14. A pneumatic tire according to claim 13, wherein the outer shoulder land has an outer shoulder lug groove extending from the outermost portion of the outer tread edge toward the tire equator and ending in the outer shoulder land, and the outer shoulder lug groove has a length which is 45% to 85% of a width of the outer shoulder land in the axial direction.

15. The pneumatic tire according to claim 4, wherein the height of the first inner apex portion is 0.55 to 0.95 times the height of the second inner apex portion in the radial direction.

16. The pneumatic tire according to claim 3, wherein each of the bead cores comprises an inner bead core piece and an outer bead core piece partitioned inside and outside in the axial direction, and the carcass ply has edges which are clamped between the inner bead core piece and the outer bead core piece.

17. The pneumatic tire according to claim 3, wherein each of the beads has a clinch rubber forming an outer surface of each of the beads such that the clinch rubber is positioned outward of the second inner apex portion in the axial direction, and the clinch rubber has a height which is greater than the height of the second inner apex portion in the radial direction.

18. The pneumatic tire according to claim 3, wherein the tread has an outer tread edge positioned outward of the vehicle when the pneumatic tire is mounted to the vehicle, the tread has a main outer shoulder groove spaced from the outer tread edge and extending along a circumferential direction of the pneumatic tire such that an outer shoulder land is formed between the outermost outer tread edge and the main outer shoulder groove, and the tread has an outer shoulder lateral groove in the outer shoulder land connecting the outermost portion of the outer tread edge and the main outer shoulder groove such that the outer shoulder lateral groove has a tiebar having a raised groove bottom.

19. A pneumatic tire according to claim 18, wherein the outer shoulder land has an outer shoulder lug groove extending from the outermost portion of the outer tread edge toward the tire equator and ending in the outer shoulder land, and the outer shoulder lug move has a length which is 45% to 85% of a width of the outer shoulder land in the axial direction.

20. The pneumatic tire according to claim 4, wherein each of the bead cores comprises an inner bead core piece and an outer bead core piece partitioned inside and outside in the axial direction, and the carcass ply has edges which are clamped between the inner bead core piece and the outer bead core piece.

* * * * *